United States Patent [19]

Köhler et al.

[11] 4,318,844

[45] Mar. 9, 1982

[54] INORGANIC PIGMENTS WITH IMPROVED GLOSS AND DISTRIBUTION IN LACQUER BINDERS

[75] Inventors: Klaus Köhler; Peter Woditsch; Heribert Stütgens; Eckhard Bayer; Klaus Nollen; Hans Sander, all of Krefeld, Fed. Rep. of Germany

[73] Assignee: Bayer Aktiengesellschaft, Leverkusen, Fed. Rep. of Germany

[21] Appl. No.: 159,746

[22] Filed: Jun. 16, 1980

[30] Foreign Application Priority Data

Jun. 20, 1979 [DE] Fed. Rep. of Germany ....... 2924849

[51] Int. Cl.³ .......................... C09C 3/08; C09C 3/10; C09C 3/12
[52] U.S. Cl. ................... 524/212; 106/262; 106/299; 106/300; 106/308 N; 106/308Q; 524/267
[58] Field of Search ............... 106/262, 308 N, 308 Q, 106/299, 300; 260/22 A, 40 R, 42.44, 22 CQ, 21, 42.21

[56] References Cited

U.S. PATENT DOCUMENTS

| | | | |
|---|---|---|---|
| 1,848,213 | 3/1932 | Wiegand | 106/308 N |
| 3,015,569 | 1/1962 | Frieser | 106/308 N |
| 3,172,772 | 3/1965 | Rowe | 106/308 N |
| 3,345,187 | 10/1967 | Binnis | 106/308 N |
| 3,506,466 | 4/1970 | Bramekamp et al. | 106/308 N |
| 3,536,510 | 10/1970 | Allen et al. | 106/308 N |
| 3,567,680 | 3/1971 | Iannicelli | 106/308 N |
| 3,649,588 | 3/1972 | Kennedy-Skipton | 106/308 Q |
| 3,849,152 | 11/1974 | Mimeault | 106/308 Q |
| 4,061,503 | 12/1977 | Berger et al. | 106/308 Q |
| 4,167,423 | 9/1979 | Williams | 106/308 Q |

FOREIGN PATENT DOCUMENTS

| | | |
|---|---|---|
| 2012017 | 10/1970 | Fed. Rep. of Germany . |
| 389831 | 6/1973 | Spain . |
| 825404 | 12/1959 | United Kingdom . |
| 959211 | 5/1964 | United Kingdom . |

*Primary Examiner*—Ronald W. Griffin
*Attorney, Agent, or Firm*—Sprung, Felfe, Horn, Lynch & Kramer

[57] ABSTRACT

An inorganic pigment exhibiting improved gloss and distribution in lacquer binders, carrying a coating comprising a polyhydrogen siloxane and an alkanolamine. Advantageously the alkanolamine comprises at least one of triethanolamine, triisopropanolamine, diethanolamine, diisopropanolamine and 2-amino-2-methylpropanol-1, the polyhydrogen siloxane is a polymethylhydrogen siloxane having more than 5 Si atoms, and the pigment comprises $TiO_2$ or a titanate carrying an inorganic coating, the polyhydrogen siloxane plus alkanolamine ranging from about 0.3 to 1% by weight of the pigment and the ratio by weight of the polyhydrogen siloxane to alkanolamine ranging from about 1:2 to 1:5.

11 Claims, No Drawings

INORGANIC PIGMENTS WITH IMPROVED GLOSS AND DISTRIBUTION IN LACQUER BINDERS

The present invention relates to inorganic pigments which have improved gloss and distribution in lacquer binders as a result of treatment with organic auxiliaries either before or during a final micronization.

Fog-free high gloss coatings and good distribution when incorporated in lacquer binders are important requirements of high quality pigments. Apart from other properties, such as good resistance to weathering and good brightening or tinting power, the above constitute important criteria for assessing quality. There has been no lack of proposals in the past for achieving such an aim. One procedure which characterizes many of the patents relating to this subject matter is the treatment of the pigment surface with organic auxiliaries before or during a grinding operation which operation concludes the process of manufacturing the pigment. The grinding of the pigment is normally carried out in a pin mill, a ball mill or a ring roll mill such as a Raymond mill, but exceptionally high quality pigments may be obtained by micronization in jet mills such as air jet or steam jet mills. Numerous compounds are known for use as organic auxiliaries for modifying the surface of pigments. Apart from polyols, alkylene oxides, phenols, long chain fatty alcohols and fatty acid esters, to name but a few examples, it has also been proposed to use organosilicon compounds.

The use of organosilicon compounds is aimed at rendering pigments or fillers hydrophobic and at improving their dispersibility and incorporation in synthetic materials. German Offenlegungsschrift No. 2,012,017, for example, describes the treatment of $TiO_2$ with sodium methyl siliconate to improve its dispersibility in polystyrene. It is also customary to render pigments hydrophobic with polysiloxanes, e.g. with octamethylcyclotetrasiloxane (British Pat. No. 959,211) to improve their incorporation in polyamides or to treat them with silanes, e.g. with trialkoxysilanes, as described in British Pat. No. 825,404.

In addition, the preparation of stable dispersions in water with the aid of polymethylsiloxanes containing Si—H groups has been disclosed in Spanish Pat. No. 389,831.

With the surface treatments described above, however, it is not possible to obtain pigments which produce an excellent fog-free gloss in lacquer binders.

It is also known to treat pigments with alkanolamines. The use of trialkanolamines, for example, has been proposed in U.S. Pat. No. 3,345,187 and the use of diisopropanolamine in German Pat. No. 2,442,678. In the process according to German Offenlegungsschrift No. 1,792,022, triethanolamine is brought into contact with the pigment surface in the course of a so-called double steam jet milling process. U.S. Pat. No. 2,737,460 relates to the milling of pigments with trialkanolamines in the presence of finely divided fillers such as Aerosil. It is also known to use salts of alkanolamines with organic acids such as, for example, lactic acid (German Pat. No. 1,271,862) or benzoic acid (U.S. Pat. No. 3,172,772).

The procedures mentioned above are either technically complicated or else expensive and the resulting pigments, although showing marked improvements compared with titanium dioxides which have not been organically treated, do not meet the highest demands for quality with regard to gloss distribution and subdivision, and this applies particularly to pigments which have been after-treated with $SiO_2$ and $Al_2O_3$.

It has now surprisingly been found that pigments with improved gloss and distribution in lacquer binders can be obtained easily by treatment with organic auxiliaries before the final micronization if a combination of polyhydrogen siloxanes and alkanolamines is used.

The present invention provides inorganic pigments with improved gloss and distribution in lacquer binders having a coating of polyhydrogen siloxanes and alkanolamines and also a process for the preparation thereof by coating the pigments with the above mentioned compounds before or during the final micronization. White pigments based on $TiO_2$ or titanates which have optionally been after-treated inorganically are particularly suitable inorganic pigments. The new pigments are suitable in particular for pigmenting polymer materials and aqueous suspensions. It has been found to be advantageous to use a ratio by weight of polyhydrogen siloxane to alkanolamine within the range of about 2:1 to 1:10, preferably about 1:2 to 1:5.

The polyhydrogen siloxanes used may have a straight chain, a branched chain or a cyclic structure containing for example the following units, optionally in alternating arrangement:

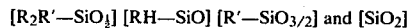
$[R_2R'—SiO_{\frac{1}{2}}]$ $[RH—SiO]$ $[R'—SiO_{3/2}]$ and $[SiO_2]$ wherein R and R' are the same or different and each may denote a hydrogen atom or an alkyl, cycloalkyl, aryl and/or alkenyl group, and the number of silicon atoms is greater than 5.

Polyhydrogen siloxanes which conform to the above definition include, for example, [SiMe₃] end blocked linear polyhydrogen methyl siloxanes, preferably having chain lengths with an average of 10, 30 or 50 [SiMe₂O] units. Partially hydrogenated polysiloxanes of the type described are also suitable, particularly those having 5 [SiHMeO] or 5 [SiMe₂O] units. Polyvinyl hydrogen methyl siloxanes which are [SiHMe₂] end blocked are particularly preferred, especially those with 5 [SiHMeO] units and 3 [Si(CH=CH₂)MeO] units. Another preferred class of compounds is polyhydrogen siloxanes, an example of which is a [SiHMe₂] end blocked, simply branched permethylated polysiloxane having 9 [SiMe₂O] units.

The alkanolamines used may be trialkanolamines, dialkanolamines and/or monoalkanolamines, e.g. amines carrying alkyl and/or hydroxyalkyl groups of 1 to 4 carbon atoms. Triethanolamine, triisopropanolamine, 2-amino-2-methyl-propanol-1 and 2-amino-2-hydroxymethyl-propanediol-(1,3) are particularly suitable.

The organic auxiliaries are brought into contact with the pigment in known manner either before or during a final milling operation. It is immaterial whether they are added to the moist filter cake, paste or sludge obtained in the course of preparation of the pigment before it is dried or whether they are added to the dry substance before the final milling operation in some suitable manner, for example by spraying or even whether as in the case of milling in a steam jet mill, they are directly added to the steam before this is fed into the mill. Also, the effectiveness of the compounds to be used according to the present invention does not depend upon the sequence in which they are added. Regardless of whether mixtures of alkanolamines and polyhydrogensiloxanes are added or whether the alkanolamine is added first and the polyhydrogensiloxane later, or vice versa, the pigments obtained are superior in their gloss, fog and granularity after micronization than products which have been treated with alkanolamines alone or with polyhydrogensiloxanes alone. This clearly indicates a synergistic effect.

All inorganic white and colored pigments are suitable for the process according to the present invention. Particularly advantageous results are obtained with white pigments based on $TiO_2$ or titanates or with colored pigments such as iron oxides. Pigments which have previously been subjected to an inorganic after-treatment may also be used.

The process according to the present invention for improving gloss and fog is independent of the process used for producing the pigments. Thus a $TiO_2$ pigment may be improved by the process according to the present invention regardless of whether the pigment has been prepared by the sulphate process or the $TiCl_4$ combustion process and also regardless of whether the pigment is in the rutile or the anatase form.

To test the pigment for gloss and distribution in lacquer binders, it is dispersed in a lacquer binder by means of a dissolver. Dispersion is carried out in a highly viscous binder/solvent mixture containing 60% of alkyd resin (ricinene-modified alkyd resin, oil length 35; Bayer Product Alkydal ® 35) in xylene under the following conditions:

| | | |
|---|---|---|
| Pigment-volume concentration (PVK) of grinding stock | 37.6% | |
| Diameter of dissolver disc | 3.5 | cm = D |
| Diameter of container | 5.5 | cm = 1.57 D |
| Distance of dissolver disc from bottom | 1.75 | cm = 0.5 D |
| Height to which grinding stock fills container | 3.5 | cm = D |
| Peripheral speed of dissolver disc | 11 | m/s |
| Dispersion time | 5 | minutes. |

After 5 minutes' dispersion time, samples are removed and lacquered to a PVK of 15% with the alkyd resin and a melamine resin (trade product Maprenal MF 800, registered Trade Mark of Hoechst AG) so that the ratio of alkyd resin to melamine resin is 77:23. The degree of fineness of dispersion is determined in the usual manner with a grindometer (DIN 53 203). The lacquers prepared in this way are then applied to glass plates to form films 120 μm thick when wet, and the films are hardened at 120° C. for 30 minutes. The gloss is measured with a Gonio photometer at an angle of 25°. The height of the peak obtained in the reflection maximum is a measure of the gloss and the height of the scatter curve 1° next to the reflection maximum is a measure of the gloss fog value.

A high gloss lacquer is distinguished by high gloss values and low gloss fog values.

The preparation of the pigments according to the present invention is described below:

EXAMPLE 1

A $TiO_2$ pigment having a rutile structure and prepared by the sulphate process was after-treated inorganically with 3.8% $SiO_2$ and 4% $Al_2O_3$ and was then dried after the usual washing and filtration. The pigment was sprayed with 0.12% by weight (based on the dry pigment) of the polymethyl hydrogen siloxane having a structure corresponding to the following average formula

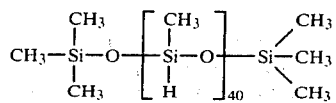

and 0.36% of triethanolamine and was then micronized in a jet mill operated on superheated steam.

The fineness of the dispersion, the gloss values and gloss fog values are set forth in Table 1.

COMPARISON EXAMPLE (A)

This comparison example shows that the use of triethanolamine solely results in a qualitatively inferior pigment. The rutile pigment used in Example 1 is sprayed with 0.48% triethanolamine after it has been dried, and it is then micronized in a jet mill as described in Example 1. The dispersion properties are entered in Table 1.

COMPARISON EXAMPLE (B)

This comparison example shows that the use of polymethylhydrogen siloxane solely also results in a qualitatively inferior pigment.

The rutile pigment used in Example 1 is dried and then sprayed with 0.48% of the polymethylhydrogen siloxane described in Example 1 and then micronized; see Table 1.

EXAMPLE 2

0.15% by weight (based on the dry pigment) of the polymethylhydrogen siloxane used in Example 1 is added to the washed filter cake of the rutile pigment as used in Example 1 before it is dried. After drying, the pigment is sprayed with 0.45% triisopropanolamine and micronized as described in Example 1; see Table 1.

EXAMPLE 3

The rutile pigment used in Example 1 is dried and then sprayed with 0.12% of the polymethylhydrogen siloxane described in Example 1 and 0.58% of 2-amino-2 methyl-1-propanol and then milled in a steam jet mill as described in Example 1; see Table 1.

EXAMPLE 4

The rutile pigment used in Example 1 is not organically after-treated; see Table 1.

TABLE 1

| Ex. | Organic treatment | Gloss (%) | Fog (%) | Grindometer value (μ) | Hegman value |
|---|---|---|---|---|---|
| 1 | 0.12% α,ω-bis(trimethylsilyl)polymethylhydrogensiloxane 0.36% triethanolamine | 88 | 24 | 12 | 7 |
| A | 0.48% triethanolamine | 77 | 37 | 20 | 6.4 |
| B | 0.48% α,ω-bis(trimethylsilyl)polymethylhydrogensiloxane | 76 | 35 | 16 | 6.7 |
| 2 | 0.15% α,ω-bis(trimethylsilyl)polymethylhydrogensiloxane 0.45% triisoprop- | 89 | 22 | 10 | 7.2 |

TABLE 1-continued

| Ex. | Organic treatment | Gloss (%) | Fog (%) | Grindometer value (μ) | Hegman value |
|---|---|---|---|---|---|
| | anolamine | | | | |
| 3 | 0.12% αω-bis(tri-methylsilyl)poly-methylhydrogen-siloxane 0.58% 2-amino-2-methyl-1-propanol | 86 | 26 | 14 | 6.9 |
| 4 | None | 49 | >100 | 38 | 4.9 |

Samples 1 to 3 show that a given weight of mixture is better than the same weight of the individual components.

It will be appreciated that the instant specification and examples are set forth by way of illustration and not limitation, and that various modifications and changes may be made without departing from the spirit and scope of the present invention.

We claim:

1. An inorganic pigment exhibiting improved gloss and distribution in lacquer binders, carrying a coating comprising a polyhydrogen siloxane and an alkanolamine.

2. An inorganic pigment according to claim 1, carrying about 0.1 to 3% by weight of polyhydrogren siloxane plus alkanolamine, the ratio by weight of the polyhydrogen siloxane to the alkanolamine ranging from about 2:1 to 1:10.

3. An inorganic pigment according to claim 1, comprising $TiO_2$ or a titanate.

4. An inorganic pigment according to claim 1, wherein the polyhydrogen siloxane has more than 5 Si atoms and comprises the units

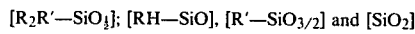

[$R_2R'$—$SiO_{\frac{1}{2}}$]; [$RH$—$SiO$], [$R'$—$SiO_{3/2}$] and [$SiO_2$]

wherein R and R' each independently is hydrogen or an alkyl, cycloalkyl, aryl or alkenyl radical.

5. An inorganic pigment according to claim 4, wherein the polyhydrogensiloxane is a polyalkylhydrogen siloxane, a polyarylhydrogen siloxane, a polyalkylenylhydrogen siloxane, or a polyarylalkylhydrogen siloxane.

6. An inorganic pigment according to claim 5, wherein the polyhydrogen siloxane is a polymethylhydrogen siloxane.

7. An inorganic pigment according to claim 1, wherein the alkanolamine comprises at least one of triethanolamine, triisopropanolamine, diethanolamine, diisopropanolamine and 2-amino-2-methyl-propanol-1.

8. An inorganic pigment according to claim 7, wherein the polyhydrogen siloxane is a polymethylhydrogen siloxane having more than 5 Si atoms, and the pigment comprises $TiO_2$ or a titanate carrying an inorganic coating, the polyhydrogen siloxane plus alkanolamine ranging from about 0.3 to 1% by weight of the pigment and the ratio by weight of the polyhydrogen siloxane to alkanolamine ranging from about 1:2 to 1:5.

9. In the preparation of an inorganic pigment wherein the pigment is produced by chemical reaction and is thereafter micronized, the improvement which comprises mixing with the pigment before or during micronization a polyhydrogen siloxane and an alkanolamine.

10. A process according to claim 9, wherein the alkanolamine comprises at least one of triethanolamine, triisopropanolamine, diethanolamine, diisopropanolamine and 2-amino-2-methyl-propanol-1, the polyhydrogen siloxane is a polymethylhydrogen siloxane having more than 5 Si atoms, and the pigment comprises $TiO_2$ or a titanate carrying an inorganic coating, the polyhydrogen siloxane plus alkanolamine ranging from about 0.3 to 1% by weight of the pigment and the ratio by weight of the polyhydrogen siloxane to alkanolamine ranging from about 1:2 to 1:5.

11. A polymeric material pigmented with a pigment according to claim 1.

* * * * *